United States Patent [19]

Kölblin et al.

[11] Patent Number: 4,675,977
[45] Date of Patent: Jun. 30, 1987

[54] MACHINE TOOL

[75] Inventors: Rolf Kölblin, Herrsching; Reinhard Schneider, Bergneustadt; Heinrich Burgtorf, Remscheid; Klaus Peiss, Wermelskirchen, all of Fed. Rep. of Germany

[73] Assignee: Gebruder Honsberg GmbH, Fed. Rep. of Germany

[21] Appl. No.: 864,592

[22] Filed: May 16, 1986

[30] Foreign Application Priority Data

Jun. 1, 1985 [DE] Fed. Rep. of Germany ....... 3519706

[51] Int. Cl.⁴ ........................................... B23Q 3/157
[52] U.S. Cl. ..................... 29/568; 409/135; 409/238
[58] Field of Search .................... 29/568; 409/238, 135

[56] References Cited

U.S. PATENT DOCUMENTS

| 3,509,619 | 5/1970 | Lipp | 29/568 |
| 3,521,526 | 7/1970 | Olig et al. | 409/135 |
| 3,650,018 | 3/1972 | Perry et al. | 29/568 |
| 4,164,810 | 8/1979 | Sipek et al. | 29/568 |

FOREIGN PATENT DOCUMENTS

| 1627048 | 10/1970 | Fed. Rep. of Germany | 29/568 |
| 2422481 | 12/1979 | France | 29/568 |
| 2127332 | 4/1984 | United Kingdom | 29/568 |

Primary Examiner—Gil Weidenfeld
Assistant Examiner—Steven C. Bishop
Attorney, Agent, or Firm—Spensley Horn Jubas & Lubitz

[57] ABSTRACT

The machine tool comprises a vertical post (14) on which a head changer (19) is mounted for changing the tool head (17) provided at a head carrier (16). The head changer (19) is rotatable about a vertical axis. It carries at least one head gripper (22) which is adapted to grip from the top the tool head (17) and to rotate it from a front working position to a rear changing position. The post (14) being nonrotational (about any axis) and preferably unadjustable in height (the Y axis), is simple and low cost. The machine tool is readily adaptable to sophisticated design modifications, particularly including tool exchange in plural multi-tool tool heads and interchange with tool and/or tool head storage magazines.

29 Claims, 12 Drawing Figures

MACHINE TOOL

BACKGROUND OF THE INVENTION

1. Field of the Invention

The invention relates to a machine tool comprising a vertical post, a head carrier mounted on said post and carrying at least one driven tool head, and a head changer having at least one head gripper movable into a changing position suited for the receipt of the tool head provided detachably at the head carrier.

2. Description of the Prior Art

There are known machine tools such as taught in German laid-open Patent Application No. 33 28 230 which may be composed of different units in accordance with the mechanical assembly technique, the vertical post including a head carrier to which a tool head may be fixed interchangeably. The vertical post or head carrier contains driving means to couple thereto a tool head such as a headstock, or a drill head, if the tool head is applied to the head carrier. A separate tool head magazine contains a number of tool heads. A head changer is adapted to grip each of the tool heads in order to deliver it to the head carrier of the vertical post, the head changer being mounted as a separate unit intermediate the head magazine and the vertical post of the machine tool. The head magazine is located on the rear side of the vertical post and is averted from the working position of the workpiece under treatment. Therefore, it is necessary to turn the vertical post about its vertical axis in order to move the tool head from the working into the changing position. While different unit-by-unit stages from a simple single axis working machine to a three axis machine with an automatic head changer and an automatic tool changer are implemented in known machine tool systems, it is mandatory to provide as a basic module in such systems a vertical post being rotatable about its vertical axis.

Even in case of the simplest variant of a single-axis working machine, a vertical post rotatable about its vertical axis has to be taken into consideration even though no benefit is derived therefrom, because rotatability of the vertical post becomes relevant only in case of an automatic changing system for tool heads within a more highly developed design. Nevertheless, even in the less developed working machine assembly, a rotary system and a corresponding drive in the post are required, producing a resultant increase in cost.

There are also known machine tools comprising a head carrier for a number of polygonally arranged tool heads of which each, by turning the head carrier, may be swivelled into a working position. It is possible to interchange the head carrier in total and, moreover, to exchange the individual tool heads at the head carrier. Yet a post rotatable about its vertical axis is also needed as a basic component of such machine tools.

Finally, there is known in the prior art a particular tool changing system taught in German laid-open Patent Application No. 33 29 539 wherein the vertical post supporting the tool head may be moved back from its working position. A rotatable ring assembled in the lower region of the post carries a number of head grippers. By rotating the ring about its vertical axis, the tool head is moved into a depositing position, and, by rotating it further, another tool head may be mounted to the post. Thus, for changing tools, translatory movements of the post and rotary movements of the ring are necessary. Further, in order to couple the tool heads to or to decouple them from the post, lifting movements have to be performed.

The known machine tools provided with interchangeable tool heads are disadvantageous because, in order to change a tool head, the vertical post has to be turned or be moved translatorily into a basic position, thus enabling the tool head to move from the working into the changing position. This action requires that large masses should be accelerated or decelerated. Moreover, subsequent to the turning movement of the vertical post, the head changer is subjected to a cycle of movements taking much time; time which is lost in processing of the workpiece.

SUMMARY OF THE INVENTION

Machine tools should be capable of being versatile, and they are expected to operate, in accordance with a programmed control, with various tool heads or tools in order to realize different machining operations. The present invention is a machine tool according simpler and quicker mounting of tool heads or tools. The term "tool head" has a general meaning in this context. It includes any type of tool supports holding stationary or movable tools, in particular headstocks and drill heads. A tool head may be also a multispindle head.

It is the object of the present invention to provide a versatile machine tool mounting various tool heads, in order to perform different machining operations, which by a simple design of its operational basic elements, allows the tool heads to be quickly changed.

The problem of simple and rapid interchange of tool heads is solved in accordance with the invention in that the head changer is interchangeably mounted on the post and adapted to rotate about a vertical axis, and in that the head gripper at the head changer is mounted such as to seize from the top the tool head in the changing position.

The basic machine tool of the present invention has a vertical post which need not be rotatable about its vertical axis. In one variant of the invention, the post carries at least one tool head and, in another variant, it may be fitted with a head changer adapted to rotate about the vertical post axis. Preferably, the machine tool of the invention forms part of a system which optionally may be composed of and extended to different components. The basic unit of the system incorporates a vertical post which, in case of the simplest design, includes but one only head carrier and one only tool head. For example, in a three-axis machine, the vertical post may be used as a carriage movable in the Z axis direction. Further, the head carrier may be displaceable vertically on the vertical post. As a consequence and advantage of the present invention, the basic tool interchange unit used, not only in the simple but also in the more highly developed designs, is a non-rotatable vertical post or support for the head changer, which vertical post is of a very simple construction. Because the basic unit (the vertical post) is uncomplicated and producible at low cost, a user desirous to exclusively use the basic unit (without the changing system for the tool head) need not acquire a machine tool having additional features which are utilized only on the more highly developed designs.

The present invention accords a simple motion sequence for changing tool heads which is very advantageous as well. To change tool heads, only the head changer provided on the vertical post has to be turned. For the changing operation the vertical post need not be moved translatorily except for the short movements required to shift the tool or tool hand out of the collision range of the workpiece.

The mass of the head changer is relatively light. This allows easy acceleration or braking in moving the head gripper into the changing position in which a tool head fixed to the head carrier is received, or in which another tool head is attached to the head carrier. The driving means for the tool heads are accommodated in the nonrotatable post on which the head changer is positioned to be rotatable. No separate changing assembly beside or behind the machine tool need be installed for changing the tool head, but the changer is fixed directly on the vertical post without requiring additional space.

By the head changer of the machine tool of the present invention, one tool head may be shifted into the changing position while, at the same time, another tool head may be deposited at the rear side of the vertical post averted from the working side. Alternatively, the tool head may be passed to a computercontrolled magazine.

The machine tool of the invention is characterized by both a high versatility in tool types to be mounted as well as by quick changing operations. The masses to be accelerated for changing a tool head are quite insignificant. Therefore, a large number of tool heads of diverse types may readily and effectively be employed. Subject to the machining operations scheduled, optimized tool heads may be used, e.g., single-spindle heads, multi-spindle heads, motor spindles, spindle heads for high speeds, milling heads, facing heads, fine machining heads with or without steel adjustment, measuring heads, hydraulically supported headstocks, etc. It is also possible to use headstocks for the receipt of rotating workpieces.

Frequently, it is desirable to change one or several tools in a tool head. To this end, a number of the prior art tool changing systems are capable of removing a tool from the tool head and replacing it by another tool. The machine tool of the invention (with or without a head changer) may be provided with a tool changer comprising a holder pivotable about a first horizontal axis at the location of a carrier interchangeably mounted on the post. The gripper arm of the tool changer is movable along a second axis extending at right angles relative to the first axis. The tool is moved horizontally out of the tool head and introduced vertically into the tool magazine, which need not be fitted with tiltable tool cases. It is very favorable in operation that, in case of a tool interchange, the tool head should be removed but for a short time only from the workpiece, and that the distance moved from the workpiece required to change the tool should be kept as small as possible. This the present invention accomplishes: it is only necessary to remove the tool out of the collision range.

The tool change may be mounted in place of or in addition to the head changer on the vertical machine tool post. Alternatively, a tool changer and/or a tool magazine may be provided at the right-hand or left-hand side(s) of the post. In case of an existing head changer, the tool change may be realized in the rearward position by means of a manipulator which may also exchange tools of the magazine.

Further aspects and embodiments of the invention will be explained hereafter in more detail with reference to the drawings.

DESCRIPTION OF THE PREFERRED EMBODIMENT

Figure 1:
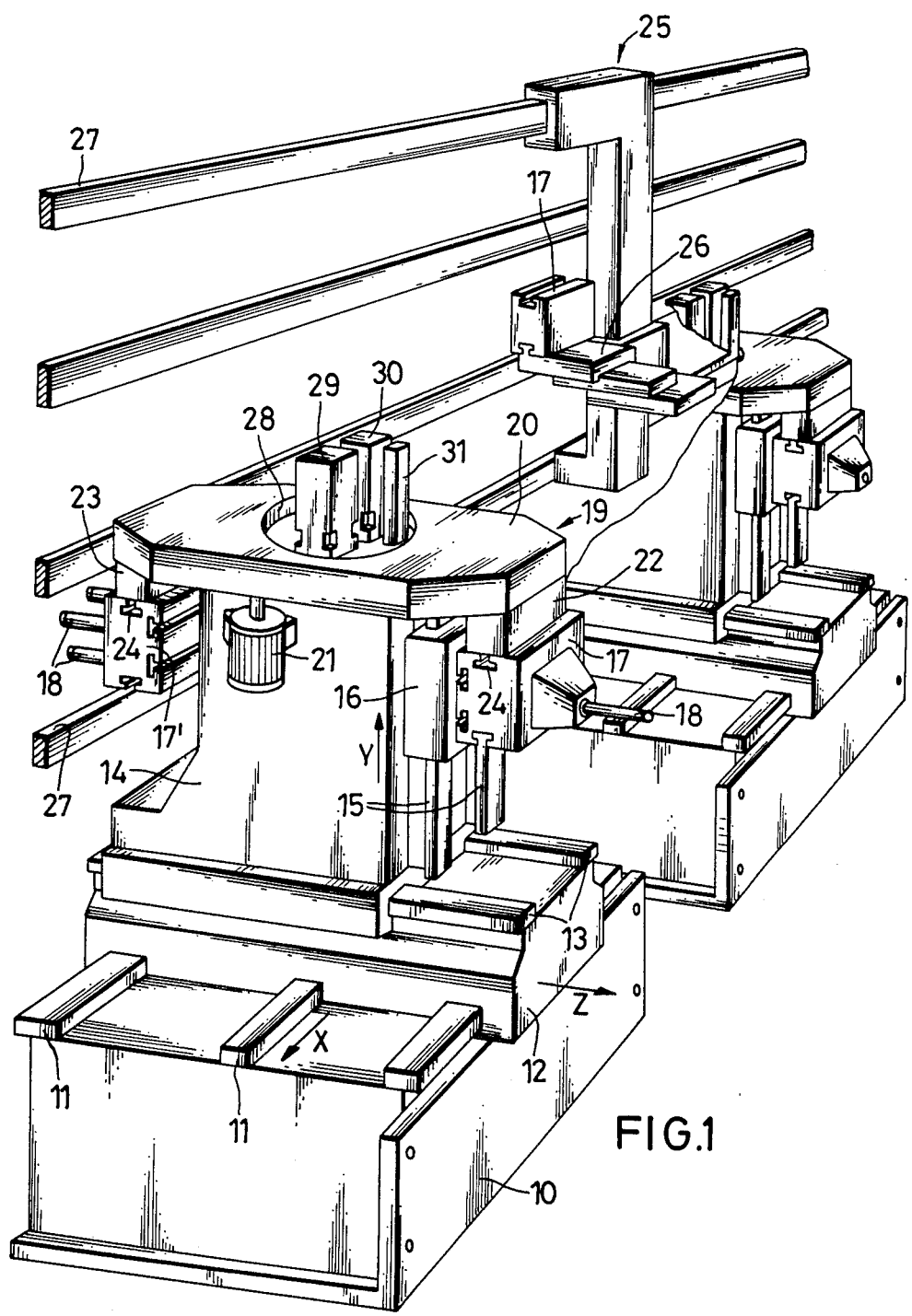
FIG. 1 shows a perspective view of a versatile production line of a number of machine tools.

Referring to FIG. 1, in a number of machine tools arranged along a production line and controlled numerically, each assembly has a machine bed 10 forming the machine tool base and is provided with guide gibs 11 which extend in the X axis. The horizontal carriage 12 is movable in the X axis direction and includes guide gibs 13 which extend in the Z axis towards the (non-illustrated) workpiece.

A vertical post 14 which is guided on gibs 13 includes guide gibs 15 on which the head carrier 16 is displaceable vertically (in the Y axis direction). The head carrier 16 is a carriage whose front side is confronted with the workpiece. It supports an interchangeable tool head 17 for mounting a headstock adapted to receive one or more machining tools 18. The head carrier 16 is provided with a catching means for seizing, positioning and locking the tool head 17. The head carrier further contains a coupling system for transmitting driving force from a (nonillustrated) drive shaft inside the post 14 to the tool head 17.

The head changer 19 for changing the tool head 17 consists of a horizontal support 20 positioned at the upper end of post 14 and adapted to rotate about a vertical axis. The head changer 19 is driven by a motor 21 secured to the post 14 and driving a pinion engaging a gear crown of the support 20. From two diametrical points of support 20, head grippers 22 and 23 extend downwardly. Each of the head grippers 22 and 23 is capable of seizing from above a tool head 17 having at its upper side a receiving means 24 through inserting a gripping member of the head gripper 22. The gripping member is T-shaped and, by being rotated about its vertical longitudinal axis, it may be locked in the holder 24. The driving means for the locking system are accommodated in the head gripper 22. The head carrier contains a thermostable suspension for tool heads which is so designed that the tool head axis maintains its position in case of thermal fluctuations.

In order to remove the tool head 17 from the head carrier 16, the latter is shifted along the Y-axis into a position at which the height of the tool head 17 is such as to allow changing. As shown in FIG. 1, the head gripper 22 is already in the changing position. As soon as the tool head 17 is advanced to the bottom side of head gripper 22, it will be seized by the gripping member of the latter. Subsequently, by releasing the fixation of the tool head at the head carrier 16, the tool head 17 still hangs at the head gripper 22 only, and the head carrier 16 may be lowered in idle condition. Thereafter, motor 21 rotates head changer 19 through 180°, whereby the tool head 17' previously situated in the delivery position is rotated into the changing position, and the tool head 17 previously situated in the changing position is rotated into the delivery position. Upon the travel of the head carrier 16 to a point behind the tool head 17', the tool head is locked at the head carrier 16. At the same time, the drive connection for tools 18 is established. The locking of the head gripper 22 is released so that the head carrier 16 together with the tool head 17 may travel along the Y-axis to be set in the required position. The tool head 17 now being in the depositing condition on the rear side of post 14 may be placed on a depositing means which, in the simplest case, is a stationary plate having a number of deposit points. By a corresponding movement of post 14 or of the carriage 12, the rear head gripper may be moved into any deposit position desired and a tool head may be placed down or a deposited tool head may be gripped.

The preferred embodiment of FIG. 1 illustrates a depositing system comprising a delivery means 25 including a delivery table 26 movable horizontally and vertically. The delivery means 25 is a carriage slidable along a shelf system by means of guide gibs 27 in parallel to the machine tool row. It is possible to move the delivery table 26 to each machine tool head carrier beneath the delivery point in order to receive the corresponding tool head and to place it down in a (non-illustrated) rack. Further, the delivery table 26 may remove the tool head 17 from the rack in order to feed it to the machine tool in the delivery position. The corresponding tool head is then seized by the head gripper 23 and, by turning the head changer 19, it is moved into the changing position whereat the tool head is positioned so as to allow its coupling to the head carrier 16. By way of the delivery means or by a manipulator, tools from the magazine may be optionally assembled and disassembled on the rearward tool head, and tools may be removed from or deposited in the shelf or rack system.

The central region of head changer 19 comprises an opening 28 through which protrude the different driving means of the post 14, said driving means including a motor 29 for the movement of the head carrier 16 along the Y-axis, a motor 30 for the spindle drive of tool head 17 and a hydraulic cylinder 31 for the weight compensation of the tool head 17.

The movements along all of the three axes Y, X and Z are sensed by (non-illustrated) distance measuring systems and the sensed displacements are supplied to a numerical control device for monitoring the processing and tool head changing operations.

In case of the machine tools shown in FIG. 1, the change of the individual tool heads and their deposition may be performed automatically. Top support 19' shown in FIG. 2 comprises two pairs of head grippers, of which head grippers 22 and 23 of the one pair are provided with a tool changer 32. The head grippers 22 and 23 are directed opposite to each other by 180°, and the head grippers 33 and 34, offset thereto by 90°, are also mutually opposite by 180°. The upper side of the support 19' contains an annular tool magazine 35 which may consist of a rotatable ring or of a circulating chain system. The tool magazine 35 is provided with a plurality of vertical openings 36 for the insertion of individual tools. Each opening 36 may be moved into a delivery position for the corresponding tool changer 32. The tool changer 32 has a U-shaped yoke 37 whose ends are hinged at the associated head gripper 22 or 23 and which is pivotal about a horizontal axis 38. To the central part of the U-shaped holder 37 there is fixed a linear drive 39 movable along the axis 40 extending at right angles to axis 38. The axis 40 supports the gripper arm 41 which is also pivotal about axis 40. The gripper arm 41 includes two gripping systems in opposite directions comprising a gripping hand 42 or 43 adapted to encompass and retain a tool 18a or 18b. To this effect, the tools have a corresponding groove. Each gripping hand is provided with two synchronously controlled gripping fingers adapted to extend out of the gripping arm 41 and to move towards each other to encompass tool 18a or 18b. In a manner known in the prior art for fixing and locking inside the tool head 17, tools 18a and 18b include steep taper couplng 44 and catch bolts 45.

Figure 2:
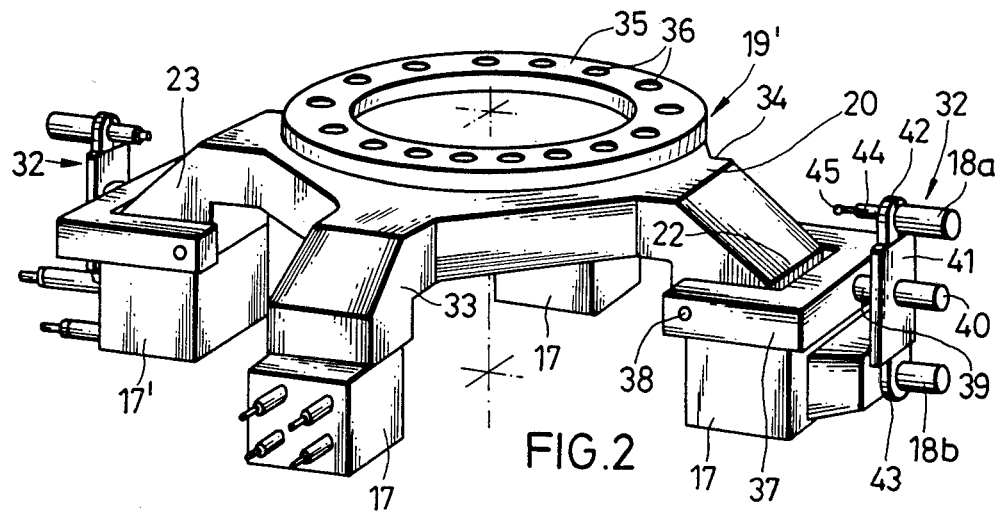
FIGS. 2 to 4 show perspective views of different embodiments of the head changer being provided with an additional tool changer.

According to the situation shown in FIG. 2, the tool 18b is removed from the tool head 17 by means of gripper hand 43 in that, by actuating the linear drive 39, the gripper arm 41 is moved towards the axis 40. Upon the extraction of tool 18b, the gripper arm 41 is swivelled about axis 40 thus causing tool 18a to be present in front of the opening of the tool head 17. By withdrawing the linear drive 29, tool 18a is introduced into the tool head 17 to be coupled at the drive site and locked. Now, holder 37 is tilted up about axis 38 while, at the same time, the linear drive 39 is moved out to enable the one gripper hand of gripper arm 41 to get above the opening 36 in the delivery position of the tool magazine 35. By a corresponding reverse atuation of the linear drive 39, the tool may be lowered into said opening 36. The removal of the tools may be performed in a complementary way to their deposition in the tool magazine 35.

In case of the embodiment of FIG. 2, one tool changer 32 is assigned to each of the individual head grippers 22 and 23. Thus, since the tool is changed when the corresponding tool head 17 is present at one of the head grippers, then the tool change may take place, for example, at tool head 17' which is at the rear of the machine and momentarily not in use. Such a tool change during periods when the tool is not in use advantageously saves time.

The tool changers 32 according to FIG. 2 need not be combined one-to-one with head grippers 22 and 23, but, in place of the head changer 19', only one support 34 may be provided with at least one tool changer on the vertical post 14. In such a case, the individual tools of the corresponding tool head are interchanged c rather than the tool heads 17 or 17'.

The provision of a number of head grippers 22, 23, 33, 34 involves the advantage of selectively mounting at the head carrier for specific processing operations different tool heads which are used successively and which differ from one another by distinctive tool seats, torques, speed ranges, etc. By this means, use may be made of tool heads with different spindle types, e.g., tool heads with extremely rapid or slow spindles and with specific seats for the tools. Further, use may be also made of duplex-tool changers in changing two tools at the same time.

The machine tool of the invention preferably serves for machining fixed workpieces. All required movements and processing operations are made by the machine tool rather than by the tool.

Figure 3:
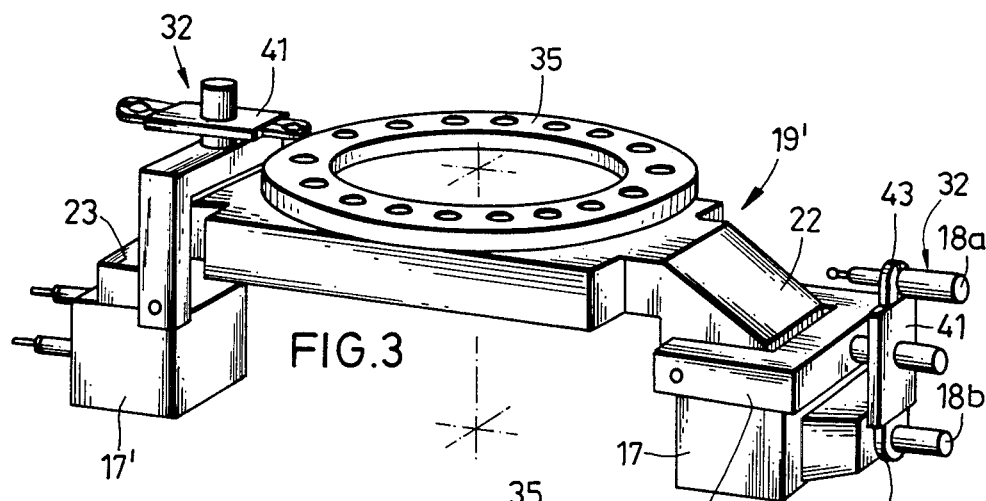

Now, with reference to FIG. 3, the head changer 19' shown therein differs from that of FIG. 2 only in that, in place of four head grippers, only the two head grippers 22 and 23 are provided, while head grippers 33 and 34 of the embodiment of FIG. 2 have been omitted. Each of the head grippers 22 and 23 includes a tool changer 32 mounted in the manner described above. Further, a tool magazine 35 rotatable on the head changer 19' is adapted to cooperate with the tool changers 32. Due to the presence of a number of tool changers, tools with different tool seats may be used, each tool changer being adapted to a different kind of tool seat.

Figure 4:
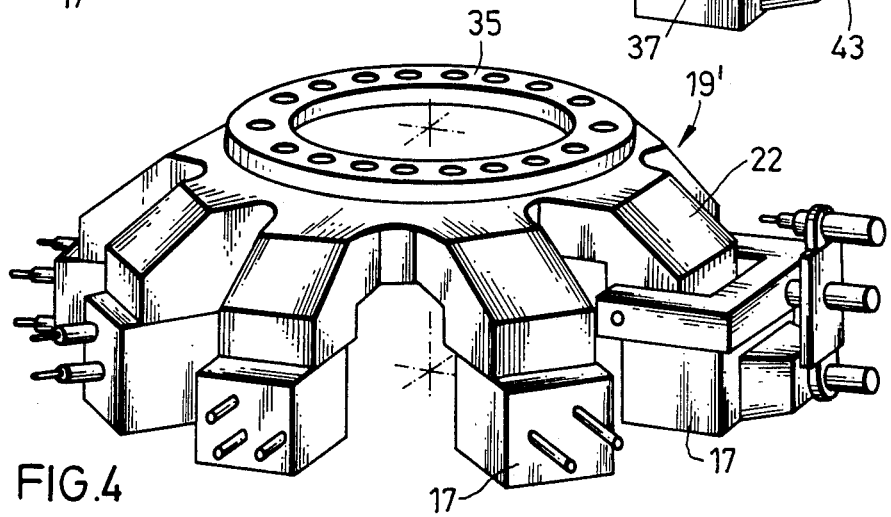

The head changer 19' shown in FIG. 4 comprises a number of head grippers 22 of which each carries a tool head 17 to be suspendedly fixed thereto. The annular head changer 19' is fitted with a plurality of head grippers 22 arranged radially.

Figure 5:
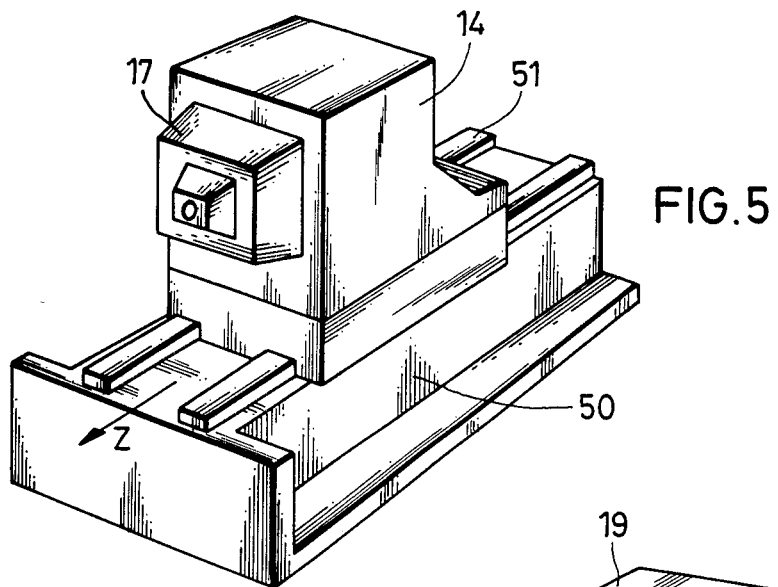
FIGS. 5 to 10 show different development stages of the machine tool system using the same basic unit without and with a changer.

FIG. 5 shows the simplest design of the vertical post of the machine tool system of the present invention. The vertical post 14 is movable along guide gibs 51 on a machine bed 50 in direction of the Z-axis. Adjustments in direction of the X-axis and of the Y-axis are not possible. The tool head 17 is fixed at the post 14 which is identical to the affixation within the threeaxis machine shown in FIG. 1.

Figure 6:
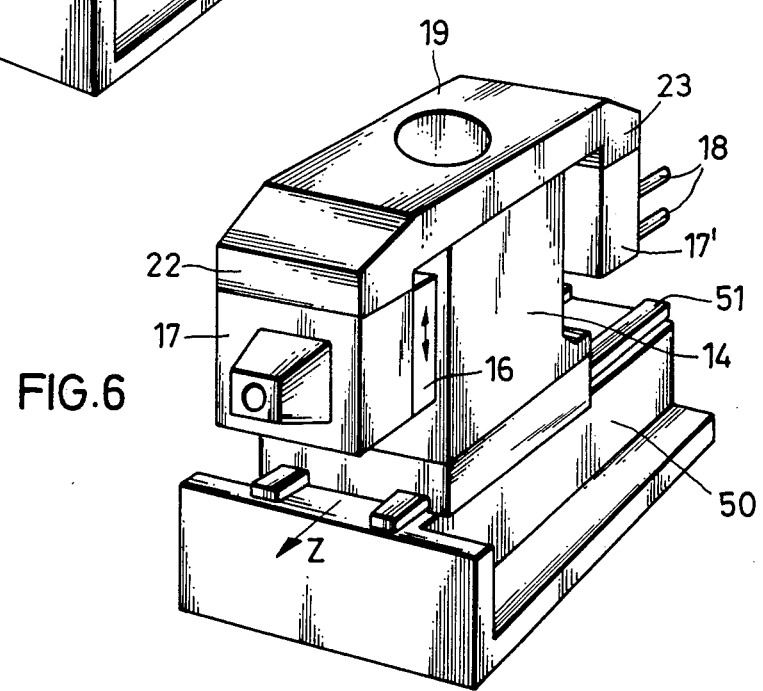

The machine tool shown in FIG. 6 is only distinctive over that of FIG. 5 in that the head changer 19 is additionally mounted on the post 14, the tool head 17 being provided on the vertically movable head carrier 16 rather than directly on the post 14. Each head gripper 22,23 of the head changer 19 may suspendedly support a tool head 17 or 17' which may be swivelled in front of the head carrier 16 of (alternatively) into the rearward position.

Figure 7:
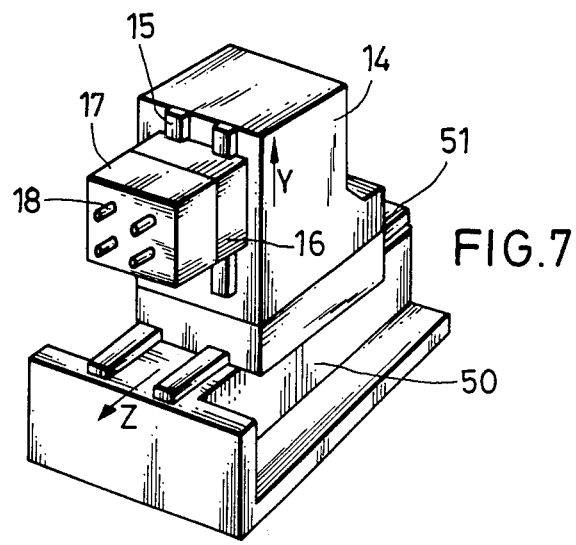

FIG. 7 shows the simplest design of a 2-axis machine wherein post 14 is provided with vertical guide gibs on which the head carrier 16 may be displaced in Y-direction, i.e., vertically, while post 14 may further be moved in Z-direction on the guide gibs 51 of the machine bed. No head changer is provided in this case.

Figure 8:
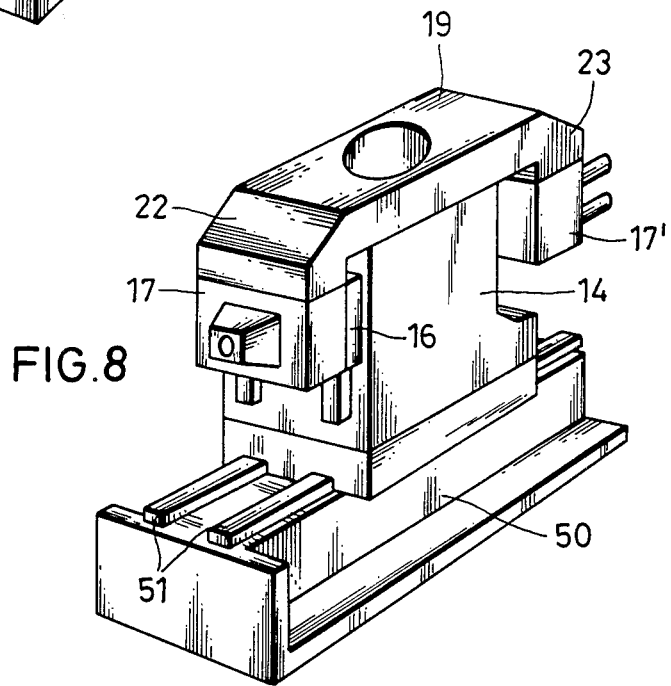

The machine shown in FIG. 8 is similar to that of FIG. 7 except for the fact that on the upper end of post 14, a head changer 19 is pivotally mounted with two head grippers 22,23. Both the machines of FIG. 7 and of FIG. 8 are 2-axis machines.

Figure 9:
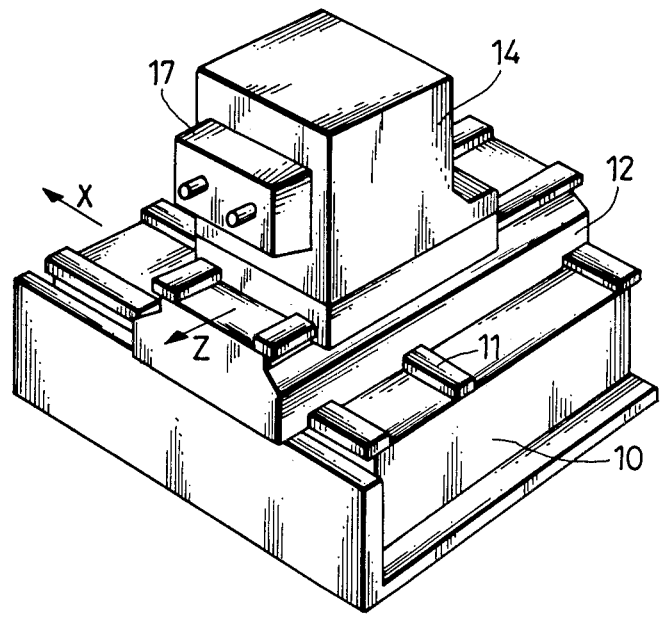
Figure 10:
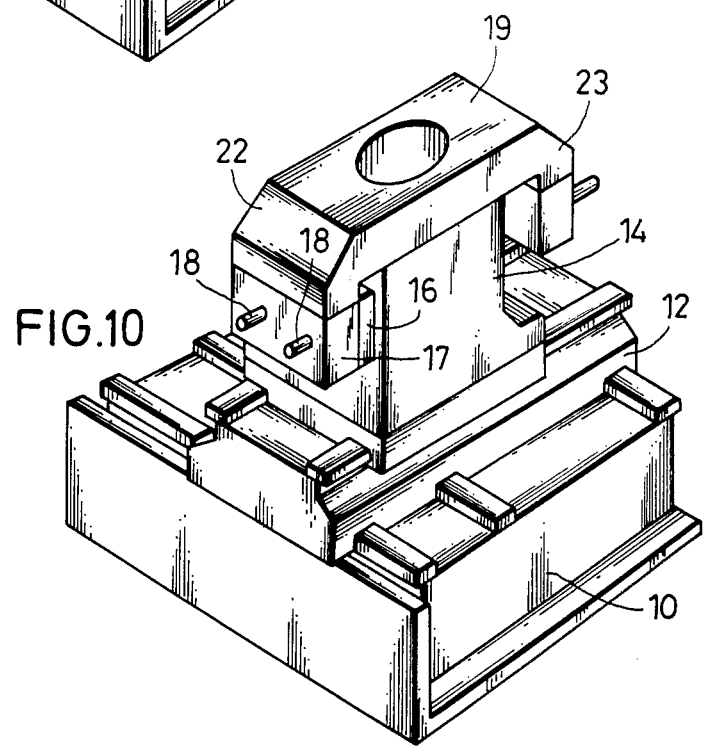

In a similar relationship are the machines shown in FIGS. 9 and 10 which are of the 2-axis type with the use of the same post 14. The tool head 17 of these units may be shifted along the X-axis and along the Z-axis but not along the Y-axis. As is evident from FIG. 9, the tool head 17 shown therein is firmly fixed to post 14. On the machine bed 10 the carriage 12 is movable in Xdirection, and on the carriage 12 the post 14 may be shifted in Zdirection. The machine of FIG. 10 additionally includes a head changer 19 mounted on post 14, and includes a head carrier 16 to which a tool head 17 may be delivered from one of the head grippers 22,23.

This post 14 is clearly noticeable in the machine tool of the present invention, even if it is somewhat squat (as in FIG. 9). Further, this post 14 is not moveable in height along the Y-axis. It is the existence of this post 14 which enables the operation of the machine tool of the present invention which is fast and flexible for changing tool heads and/or tools.

Figure 11:
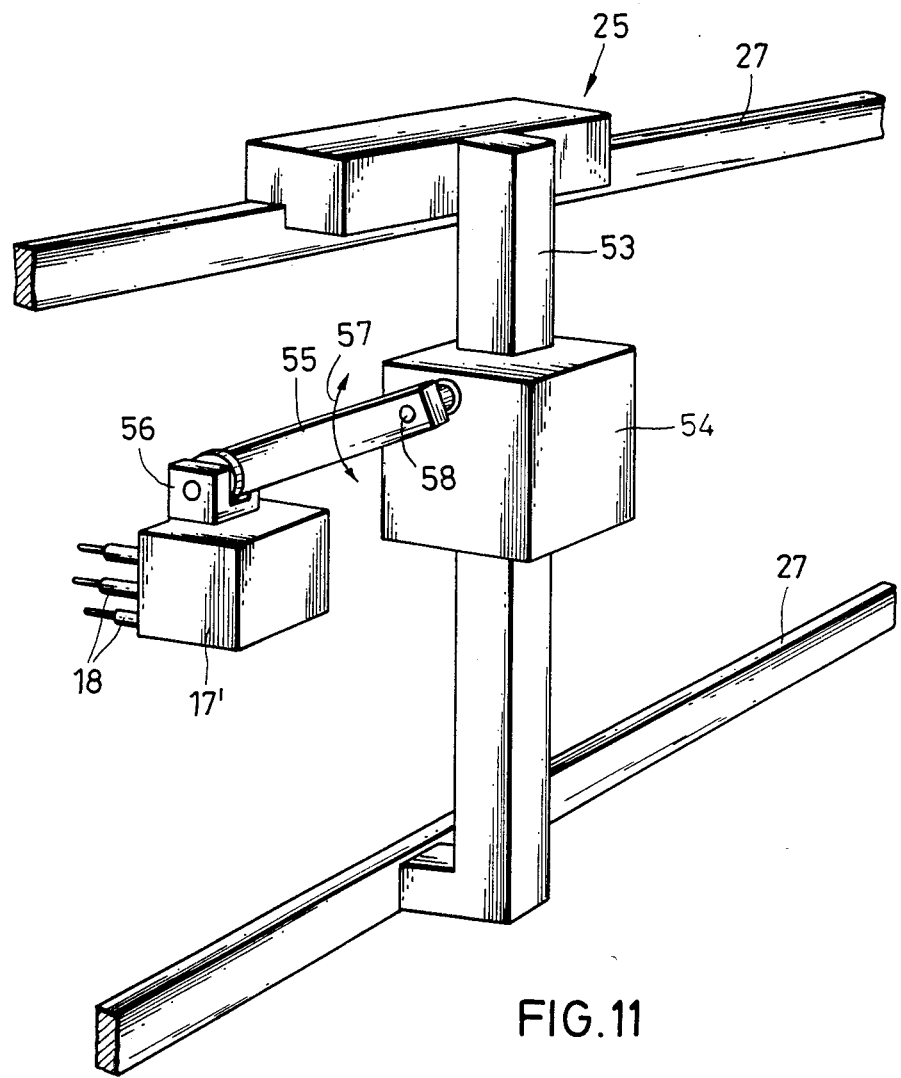
FIG. 11 is a schematic view of one embodiment of the depositing means.

FIG. 11 shows an embodiment of a relatively simple delivery means 25 utilizable in conjunction with the machine tool in order to receive tool heads 17' from the head gripper 23 (shown in FIG. 1), which is not in the working or changing position but is rather in the delivery position, and to transfer them to a depositing device. The delivery means 25 contains parallel guide gibs 27 for guiding the horizontal travel of carriage 53 which comprises a vertical beam. On this vertical beam transpires the vertical movement of carriage 54 from which projects a parallelogram guided swing arm 55. This arm has a parallel-guided head gripper 56 secured to the free end and adapted to seize from the top the tool head 17' in order to remove it from the head gripper 23 (shown in FIG. 1) of the machine tool. The tool head 17' supported at the head gripper 56 may be transported and deposited in a shelf or rack by means of carriage 53, or it may be conveyed to a remotely situated work station. Further, swing arm 55 may be swivelled about axis 58 in direction of arrow 57 in a vertical plane transverse to the guide gibs.

Figure 12:
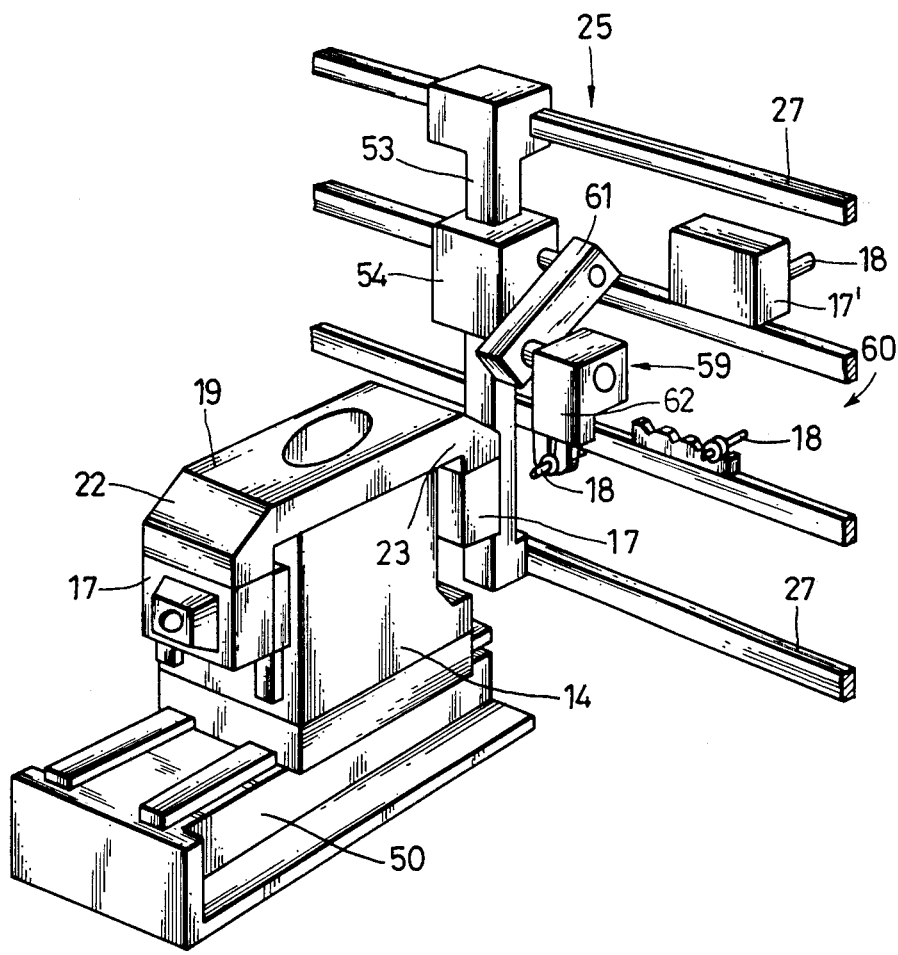
FIG. 12 shows another embodiment of the depositing means.

The delivery means 25 shown in FIG. 12 also comprises horizontal guide gibs 27 by which carriage 53 is guided to move horizontally. However, another carriage 54 may travel vertically on carriage 53, the carriage 54 comprising a manipulating means 59 adapted to remove either a tool head 17' or a tool 18 from the machine tool in order to transfer it into a rack 60. Oppositely, the delivery means 25 may remove tool heads or tools from rack 60 in order to deliver them to the machine tool. The storage sites for the deposit of the tools or tool heads are stored by computerized control, thus allowing the removal, upon demand, of a tool or tool head from the deposit position and its delivery to the machine. In the illustrated example, the manipulating means 59 consists of an arm 61 swiveling at the carriage 54 about a horizontal axis, and of a head gripper or tool grippers 62 mounted pivotally about another horizontal axis. A head gripper and a tool gripper which may be operated by computer control may also be provided. The degrees of freedom of the manipulating system 59 are sufficient to allow all required movements in the direction of all three axes.

In consideration of the preceding teaching of numerous variant embodiments of the present invention, the invention should be construed broadly in accordance with the following claims, only, and not solely in accordance with any one or ones of the particular embodiments in which the invention has been taught.

What is claimed is:

1. A machine tool comprising:
    a vertical post,
    a head carrier mounted on said post and configured to carry at least one driven tool head,
    a head changer mounted on said post and adapted to rotate about a vertical axis,
    a head gripper suspended from the head changer, said head gripper being movable to a predetermined changing position at which the tool head may be exchanged directly between the head carrier and the head gripper,
    first engagement means for engaging the top of the tool head and the bottom of the head gripper,
    second engagement means for engaging the side of the tool head and the side of the head carrier.

2. The device as defined in claim 1 wherein:
    the vertical position of the head changer mounted on the post is fixed;
    and the head carrier is mounted on a carriage movable vertically relative to the head changer.

3. The device as defined in claim 1 further comprising:
    at least one pair of head grippers suspended from the head changer, said grippers being mutually offset by 180° relative to the vertical axis of rotation of the head changer.

4. The device as defined in claim 3 wherein said head grippers are each movable to a predetermined delivery position at which the tool head may be disengaged from the head gripper, said head gripper being disposed such that one head gripper of said pair is in the changing position while the other head gripper of said pair is in the delivery position; and a depositing means positioned beneath the head gripper in the delivery position for receiving the tool head disengaged from the head gripper in the delivery position.

5. The device as defined in claim 4 wherein the depositing means is a stationary deposit table.

6. The device as defined in claim 4 wherein
the depositing means further includes a delivery means capable of moving along a rack for travelling between the delivery position and a plurality of different deposit positions.

7. The device as defined in claim 6 wherein the delivery means further includes a horizontally movable delivery table.

8. The device as defined in claim 1
wherein said first engagement means further comprises:
a gripping member disposed on the bottom of the head gripper and
a mounting member disposed on the top of the tool head, the mounting member being configured to enable the gripping member to be inserted and locked in the mounting member.

9. The device as defined in claim 1
wherein said second engagement means further comprises:
a catch means associated with the head carrier for seizing and locking the tool head engaged by the head gripper when the tool head is situated in the changing position.

10. The device as defined in claim 3 wherein the head changer further includes at least two peripherally distributed pairs of head supports.

11. The improvement as defined in claim 1, further comprising:
the head changer is a structure which contains above the upper end of the post a recess through which protrude driving means secured to the post.

12. In a machine tool having a vertical post, a head carrier mounted on said post and carrying at least one drive tool head and a head changer having at least one head gripping movable into a changing position suited for the receipt of the tool head provided detachably at the head carrier, the improvement comprising:
the head changer is mounted on said post and adapted to rotate about a vertical axis;
the head gripper is provided at the head changer so as to grip in the changing position the tool head from above; and the head changer contains a tool magazine separately rotatable about the axis of rotation of the head changer and including a plurality of receiving means for receiving a tool of the tool head.

13. The improvement as defined in claim 12, further comprising:
a tool changer assigned to said at least one head gripper comprises a holder swivelable at the head changer about a horizontal first axis, and at which a gripping arm is movable along a second axis extending perpendicularly to the first axis.

14. The improvement as defined in claim 13, further comprising:

each end of the gripping arm extending rectangularly to the second axis comprises a gripping hand and is of such a length that, in case of a holder tilted-up, one gripping hand engages a tool contained in the tool magazine while, in case of a holder tilteddown, one gripping hand engages a tool inserted in the tool head.

15. The improvement as defined in claim 14, further comprising:
each gripping hand includes two synchronously controlled gripping fingers.

16. The device as defined in claim 2 wherein the post further comprises a rigid housing having a vertical guideway for the carriage.

17. The device as defined in claim 16 wherein
the post is movable on rails disposed substantially perpendicular to the vertical post.

18. The device as defined in claim 17 wherein
the post is movable on a horizontal carriage which may be guided transversely to the rails.

19. The device as defined in claim 1 wherein the head carrier further includes a thermostable suspension for maintaining the position of the tool head in case of thermal fluctuations.

20. In a machine tool having a vertical post having secured thereto at least one tool head supporting a driven tool, and also having a tool changer which has at least one gripping arm which is swivelable into a changing position suitable for the receipt of the driven tool detachably secured to the tool head, the improvement comprising:
the tool changer has a holder pivotal about a horizontal first axis at a support which is interchangeable in position relative to the vertical post; and
the gripping arm can be moved along a second axis extending perpendicularly relative to the first axis.

21. The improvement as defined in claim 20, further comprising:
the support interchangeable in position relative to the vertical post, and at which the holder pivotal about the horizontal first axis is affixed, can attach to and move the tool head supporting the drivem tool to and from the position whereat the tool head is secured to the vertical post;
wherein the holder is pivotal, and the gripping arm can be moved, for detachment of the driven tool from the tool head even if the tool head, and the driven tool supported, is not secured to the vertical post.

22. A machine tool for operating on a workpiece in at least one of three orthogonal axes, said machine tool comprising:
a post along the one axis which neither rotates about the one axis nor moves along the one axis;
a tool unit for operating on the workpiece;
carrier means, to which said tool unit is attachable, travelling along the post for moving an attached tool unit in the one axis from a working position for operating on a workpiece to a changing position;
tool unit changer means to which said tool unit is also attachable, rotating about the axis of the post for moving an attached tool unit when detached from said carrier means to or from a remote position at which the attached tool unit does not interfere with another tool unit at the changing position, wherein said tool unit further comprises:
tool means for operating on a workpiece; and tool carrier means for releasably mounting the tool means, and;

wherein said tool unit changer means further comprises:

tool magazine means for storing the tool means; and tool changer means for moving the tool means between the tool magazine means and the tool carrier means.

23. The machine tool according to claim 22 wherein the tool changer means does operate for moving the tool means when the tool unit is in the remote position.

24. In a machine tool a tool interchange system for mounting tool carriers, at least one of which tool carriers removably mounts a tool, wherein substitution of a removably mounted tool at a tool carrier occurs when that tool carrier and its associated removably mounted tool are not interfering with another one of the tool carriers and its associated removably mounted tool which are in a working position, said system comprising:

rotatable tool carrier transport means having said tool carriers disposed about a circumference for rotating a one tool carrier and a tool mounted thereupon into a working position simultaneously when other ones of the tool carriers are rotated into positions not interfering with the working position;

tool gripper means for substituting a removably mounted tool at a tool carrier upon such times as the tool carrier is in one of the position not interfering with the working position.

25. The system of claim 24 further for the substitution of the removably mounted tool of the tool carrier from a tool magazine, said system further comprising:

rotatable tool magazine means coaxial with the rotatable tool carrier transport means for selectively positioning a one of removably mountable tools stored in an annular ring magazine proximate a selected tool carrier which removably mounts a tool when said selected tool carrier is at one of the positions not interfering with the working position; and wherein said tool gripper means are further comprising:

tool gripper means for substituting the one removably mountable tool from the rotatable tool magazine to be the removably mounted tool of the selected tool carrier.

26. The system of claim 24 wherein said tool carriers are detachable from the rotatable tool carrier transport means, wherein the tool gripper means are affixed to the rotatable tool transport means, and wherein the substituting transpires only when the selected tool carrier is attached to the rotatable tool carrier transport means.

27. In a machine tool, a method of moving a tool, removably retained in a tool carrier, from a working position of operation on a workpiece to a storage position of storage in a magazine, said method causing the tool to trace during the moving a particular spatial path, said method comprising:

first moving, by linear head carrier means, along a first axis direction, a tool carrier and a tool retained therein from the working position to a first intermediary position called the head carrier end position;

second moving, by rotating head changer means, along second and third axes directions, that tool carrier and that tool retained therein from the head carrier end position in an arcuate path to a second intermediary position, called the head changer end position;

third moving, by gripper arm means, linearly in the plane of the second and third axes, the tool from within the tool carrier at the head changer end position to a third intermediary position, called the gripper arm start position;

fourth moving, by swivel means, in a plane perpendicular to the plane of the second and third axes, the tool retained by the gripper arm means from the gripper arm start position in an arcuate path to a fourth intermediary position, called the gripper arm end position;

fifth moving, by the gripper arm means, along a first axis direction, the tool retained by the gripper arm means from the gripper arm end position to the storage position.

28. The method according to claim 27 wherein said first moving is along a first axis first direction and said fifth moving is along a first axis second direction, opposite to the first direction.

29. The method according to claim 27 wherein the tool carrier and retained tool at said head changer end position is non-interfering with any tool carrier and retained tool at either or both of said working position or said head carrier end position.

* * * * *